United States Patent
Ross et al.

(10) Patent No.: US 12,296,692 B2
(45) Date of Patent: May 13, 2025

(54) CONTROL UNIT FOR A VEHICLE

(71) Applicant: Robert Bosch GmbH, Stuttgart (DE)

(72) Inventors: Hans-Leo Ross, Lorsch (DE); Ruben Roesner, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 421 days.

(21) Appl. No.: 17/761,366

(22) PCT Filed: Sep. 23, 2020

(86) PCT No.: PCT/EP2020/076526
§ 371 (c)(1),
(2) Date: Mar. 17, 2022

(87) PCT Pub. No.: WO2021/058538
PCT Pub. Date: Apr. 1, 2021

(65) Prior Publication Data
US 2022/0348086 A1    Nov. 3, 2022

(30) Foreign Application Priority Data
Sep. 26, 2019   (DE) .................... 10 2019 214 720.8

(51) Int. Cl.
*B60L 3/00*     (2019.01)
*B60L 1/00*     (2006.01)
(Continued)

(52) U.S. Cl.
CPC .............. *B60L 3/0092* (2013.01); *B60L 1/00* (2013.01); *B60L 3/003* (2013.01); *B60L 3/0046* (2013.01);
(Continued)

(58) Field of Classification Search
CPC .......... B60L 1/00; B60L 3/0092; B60L 3/003; B60L 3/0046; B60L 53/20; B60L 58/18; H02J 1/084
See application file for complete search history.

(56) References Cited

U.S. PATENT DOCUMENTS

| 7,439,634 B2 | 10/2008 | Michalko |
| 10,044,209 B2* | 8/2018 | Namou ............... H02J 7/00714 |

(Continued)

FOREIGN PATENT DOCUMENTS

| DE | 10135736 C1 | 4/2003 |
| DE | 102015008005 A1 | 12/2016 |

(Continued)

OTHER PUBLICATIONS

International Search Report for PCT/EP2020/076526, Issued Dec. 22, 2020.

*Primary Examiner* — Hitesh Patel
*Assistant Examiner* — Luke Huynh
(74) *Attorney, Agent, or Firm* — NORTON ROSE FULBRIGHT US LLP; Gerard A. Messina

(57) ABSTRACT

A control unit for a vehicle. The control unit includes: interfaces for the connection to two independently redundant communication networks, messages to and from the control unit being transferrable via a second communication network, and vice versa, in the event of a failure of a first communication network; and interfaces for the electrical supply of the control unit via two independently redundant low-voltage networks. it being possible to electrically supply the control unit via a second low-voltage network, and vice versa, in the event of an error in a first low-voltage network.

13 Claims, 2 Drawing Sheets

(51) Int. Cl.
  *B60L 53/20* (2019.01)
  *B60L 58/18* (2019.01)
  *H02J 1/08* (2006.01)

(52) U.S. Cl.
  CPC ............... *B60L 53/20* (2019.02); *B60L 58/18* (2019.02); *H02J 1/084* (2020.01); *B60L 2210/10* (2013.01)

(56) References Cited

U.S. PATENT DOCUMENTS

| | | | |
|---|---|---|---|
| 2006/0061213 | A1 | 3/2006 | Michalko |
| 2009/0118916 | A1 | 5/2009 | Kothari et al. |
| 2018/0257703 | A1 | 9/2018 | Dreyer |
| 2018/0290642 | A1* | 10/2018 | Tschiene ................. B60T 8/885 |
| 2019/0135206 | A1* | 5/2019 | Sturza ..................... B60R 16/03 |
| 2020/0339050 | A1* | 10/2020 | Woerner ............. H01M 10/425 |
| 2022/0037913 | A1* | 2/2022 | Rapp ..................... H02J 7/0013 |

FOREIGN PATENT DOCUMENTS

| | | |
|---|---|---|
| DE | 102016215564 A1 | 2/2018 |
| DE | 102017203748 A1 | 9/2018 |
| DE | 102017125696 A1 | 5/2019 |
| EP | 3536536 A1 | 9/2019 |

\* cited by examiner

CONTROL UNIT FOR A VEHICLE

FIELD

The present invention relates to a control unit for a vehicle. The present invention furthermore relates to a control system for a vehicle. The present invention furthermore relates to a method for operating a control system for a vehicle. The present invention furthermore relates to a computer program product.

BACKGROUND INFORMATION

Conventional automated driving functions, in particular, in the event that the driver is to take over the vehicle guidance, require a certain transition and transfer time to the driver in order to enable the driver again to capture the driving situation and personally take over actual vehicle guidance functions again. Possible vehicle guidance functions to be taken over by the driver, after a transfer time, from an automated driving function may, e.g., be the deceleration and steering of the vehicle. In other possible cases, the driver has to correct the longitudinal and lateral movement functions of the automated driving functions, for example to end a passing maneuver or to guide the vehicle out of an intersection, a construction site, a tunnel, train tracks, etc.

German Patent Application No. DE 10 2016 215 564 A1 describes a method for operating an electrical network of a motor vehicle, in which a value of a parameter regarding a present situation of a power supply of electrical components of the electrical network is ascertained, and only those electrical components of the network which are not necessary for a predefined emergency operation of the motor vehicle are shut off as a function of the ascertained value.

German Patent Application No. DE 10 2015 008 005 A1 describes a method for operating a motor vehicle, a first vehicle electrical system including a first battery and a generator, a second vehicle electrical system including a second battery, and the vehicle electrical systems being coupled via a DC/DC converter, and electrical power from the first battery and from the generator being transferred into the second vehicle electrical system with the aid of a voltage conversion of the DC/DC/converter. In the event of failure of the first battery and/or in the event of a defect of the DC/DC converter, the first vehicle electrical system is also to be able to supply the second vehicle electrical system. For this purpose, it is provided that a detection device detects the failure of the first battery and/or of the DC/DC converter and, when a failure is detected, a switching device short circuits the vehicle electrical systems with one another, and sets a controller setpoint value of the generator to a voltage of the second vehicle electrical system.

In particular, during automated driving, it is importance to also design the safety-relevant functions to be error-tolerant, so that electronic functions are even available in the event of an error. Here, the redundancy has a dual function, namely discovering the error and increasing the availability of the function. In particular, in the case of longitudinal and lateral movement functions, such as, e.g., the implementation with the aid of braking and steering systems, this is a particular risk while driving since (in the event of a failure of relevant functions and components) the vehicle suddenly becomes no longer brakable, steerable, etc. The communication as well as the voltage supply should be switchable largely without interruption, so that the vehicle functions are not suddenly reduced in their performance or result in vibrations in braking, steering and drive functions.

SUMMARY

It is an object of the present invention to provide an improved control system for a vehicle.

According to a first aspect of the present invention, the object may be achieved by a control unit for a vehicle. In accordance with an example embodiment of the present invention, the control unit includes:
  interfaces for the connection to two independently redundant communication networks, messages to and from the control unit being transferrable via a second communication network, and vice versa, in the event of a failure of a first communication network; and
  interfaces for the electrical supply of the control unit via two independently redundant low-voltage networks, it being possible to electrically supply the control unit via a second low-voltage network, and vice versa, in the event of an error in a first low-voltage network.

In this way, a control unit is created which, in the event of an error of one of the networks, is still able to be supplied with electrical energy and to transfer messages. Such an independently redundant control unit supports a transfer of the vehicle into a safe state in the event of an error.

According to a second aspect of the present invention, the object may be achieved by a control system for a vehicle. In accordance with an example embodiment of the present invention, the control system includes:
  two independently redundant high-voltage networks for providing electrical energy;
  two independently redundant low-voltage networks for providing electrical control voltage;
  two independently redundant communication networks for transferring messages between control units connected to the communication networks; and
  a degradation device for diagnosing errors in the networks and for selectively degrading the control units connected to the networks, the control system offering a sufficient functionality for a driving operation of the vehicle.

According to a third aspect of the present invention, the object may be achieved by a method for operating a vehicle. In accordance with an example embodiment of the present invention, the method includes the following steps:
  diagnosing independently redundantly designed electrical high-voltage, low-voltage and electrical communication networks of a control system of the vehicle which are functionally connected to one another;
  transferring the diagnosis result to independently redundant battery management devices of the control system, an error in a first battery management device not impairing a functionality of a second battery management device, and vice versa; and
  selectively degrading control units connected to the electrical high-voltage, electrical control voltage and electrical communication networks as a function of the diagnosis result in such a way that control units connected to the electrical energy supply, electrical control voltage and electrical communication networks are still sufficiently functional for a safe driving operation of the vehicle.

As a result, the described method of the present invention provides an independently fully redundant energy, supply voltage and communication concept for a vehicle which is able to partially evacuate a case of error and provide as much functionality as is necessary for a safe driving operation of the vehicle. As a result, the described method provides a so-called "soft degradation" of functionalities, so that no abrupt function influences or function losses arise. The described method is suitable for all vehicle types, however, in particular, is useful for purely battery-electrical vehicles since these vehicles do not include an electrical energy generation system coupled to an internal combustion engine, and thus are particularly impaired in the event of a complete failure of a high-voltage network.

Advantageously, the described method maintains a minimum functionality for safety relevant systems of the vehicle (sufficient functionality). As a result, electrical supply voltages may thus be permanently provided for the control units and for the actuators, as well as electrical energy for driving, steering or decelerating the vehicle.

The object may be achieved in a fourth aspect by a computer program, in accordance with the present invention.

Advantageous refinements and embodiments of the method and of the control system in accordance with the present invention are disclosed herein.

One advantageous refinement of the control system of the present invention provides that the degradation device includes a diagnostic module for carrying out the diagnosis, and a battery management device for selectively degrading the control units. In this way, to a certain extent, a central intelligence is implemented for the control system, which carries out a diagnosis and initiates and carries out the selected degradations.

Another advantageous refinement of the control system of the present invention provides that a preventive and/or actual diagnosis of lines connected to the networks and a selective shut-off of control units connected to the networks may be initiated and carried out with the aid of the diagnostic module. An "actual diagnosis" in this connection shall be understood to mean a diagnosis based on ascertained measured values and pieces of message information. Depending on the selected safety strategy, in this way a degradation of devices and networks may be carried out in a highly dynamic and highly flexible manner.

Another advantageous refinement of the control system of the present invention provides that, in the event of an error of a high-voltage network, a DC/DC converter may be shut off, and a rechargeable battery for the electrical supply of one of the low-voltage networks may be connected. This is particularly helpful if only DC/DC converters for a generation of the 12 V control voltage are provided for electrically supplying electronic control units.

Another advantageous refinement of the control system of the present invention provides that the diagnostic module and the battery management devices are designed to be able to monitor one another. In this way, a crosswise monitoring is achieved, which advantageously increases a safety level of the control system.

Another advantageous refinement of the control system of the present invention provides that a state of the networks is ascertainable with the aid of the battery management device, corresponding data being transferrable via communication interfaces. Advantageously, in this way a kind of "central intelligence" of the control system is implemented, which supports a rapid exchange of information.

Another advantageous refinement of the method of the present invention provides that a selective shut-off of electrical consumers is delayed or carried out using predefined degradation control signals. In this way, a temporally delayed degradation for carrying out a "soft degradation" is implemented.

Another advantageous refinement of the method of the present invention provides that at least one of the control units: braking control unit, steering control unit, control unit for driver assistance systems, control unit for engine management during a driving operation of the vehicle, is kept operational. For this purpose, at least two, even better multiple, at best all control units are interconnected to form a system, with the aid of which fundamental functions of the vehicle are maintained. For example, a failure of an electrical control voltage of a low-voltage network does not result in a failure of electronic control units connected thereto.

Another advantageous refinement of the method of the present invention provides that a selective shut-off of electrical consumers connected to the networks, which is carried out based on a diagnosis, results in soft switchovers, during which the vehicle does not carry out any abrupt movements. Advantageously, a driving comfort and a safety level may thus be kept high, even during a malfunction of the vehicle.

Another advantageous refinement of the control system of the present invention provides that one of the high-voltage networks may be connected to the other high-voltage network via a coupling switch. Advantageously, this may be utilized for a mutual charging of the high-voltage batteries, a series connection of the high-voltage batteries, an energy equalization of the high-voltage batteries, etc.

The present invention is described in detail hereafter with further features and advantages based on figures. The figures are primarily intended to illustrate main features of the present invention.

Described method features result similarly from correspondingly described device features, and vice versa. This means, in particular, that features, technical advantages and statements regarding the control system of the present invention result similarly from corresponding statements, features and advantages regarding the method for operating a control system for a vehicle in accordance with the present invention, and vice versa.

DETAILED DESCRIPTION OF EXAMPLE EMBODIMENTS

Figure 1:
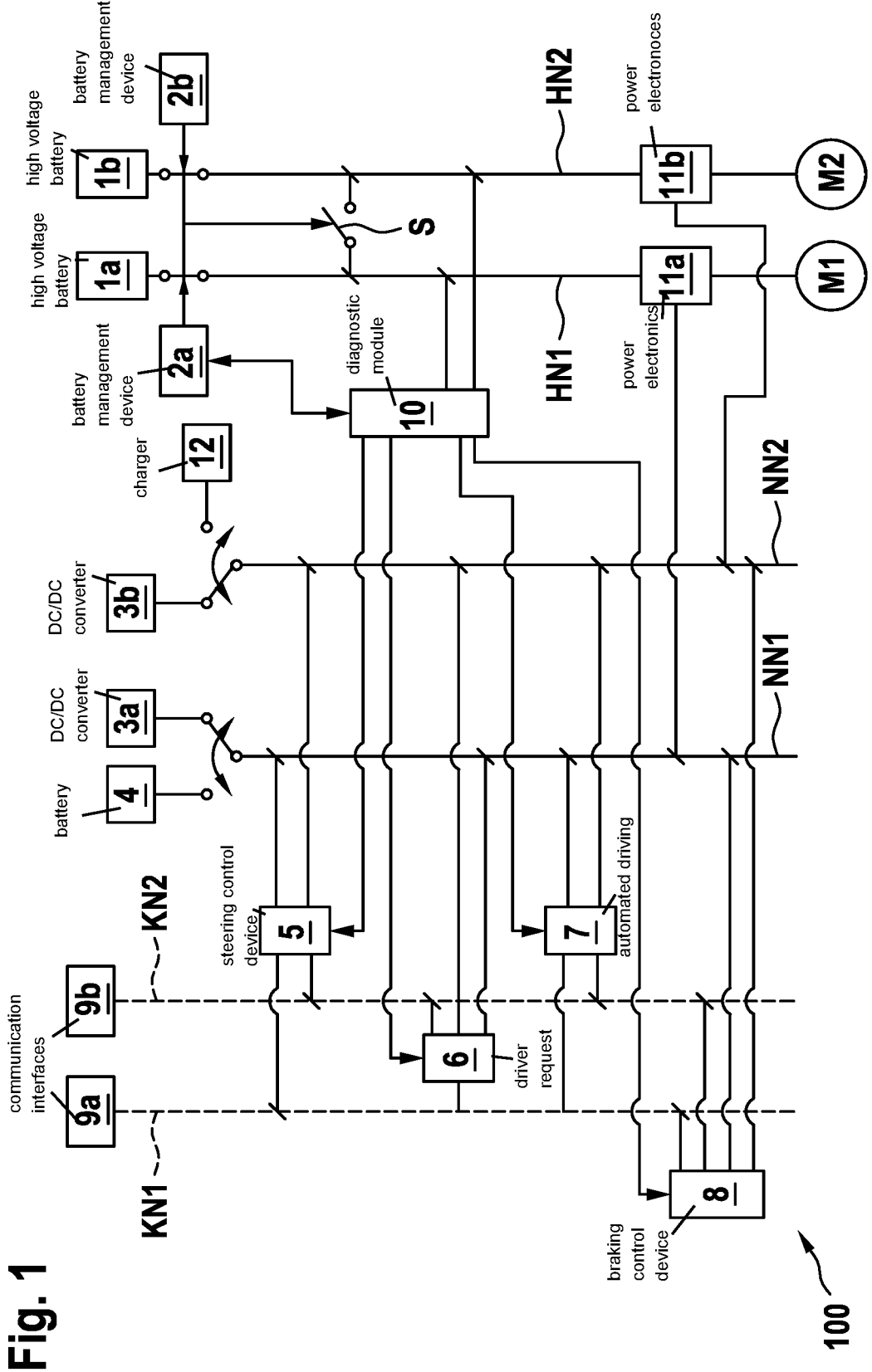
FIG. 1 shows a block diagram of one specific embodiment of a control system for a vehicle, in accordance with the present invention.

Hereafter, the term 'automated vehicle' is used synonymously in the meanings of fully automated vehicle, semi-automated vehicle, fully autonomous vehicle and semi-autonomous vehicle (synonymously: SAE Level 2/3, 4/5).

Most errors that jeopardize a safe vehicle guidance of an automated vehicle are based, among other things, on cascades in which, e.g., an error in a high-voltage battery results in shut-offs, which via a DC/DC converter may affect a 12 V battery. When the 12 V voltage supply or a communication to a control electronics of an electric motor (inverter) is interrupted, the control electronics may open battery contactors and reduce energy of the high-voltage network via windings of the electric motor. Due to various predefined high-voltage rules, the following shut-off cascades must be implemented, which result in a high-voltage shut-off:

failure of terminal 15, fuse triggered, high-voltage enable line, wire break failure of communication to inverter, battery management systems, control unit for recording a driver request (VCU), etc.

HV interlock (fuse function as protection against high-voltage influencing)

inverter error, high-voltage battery error, errors of other consumers (e.g., radiator/fan, etc.)

critical EMC influences erroneous states (such as e.g., erroneous crash detection)

All described errors, before they result in the active shut-off, may cause massive pulsations in the high-voltage and low-voltage networks of the vehicle, which, generally speaking, are tolerated by the inertia of the shut-off elements (e.g., fuse, thresholds in the software, etc.). The pulsations undesirably apply a load onto the 12 V battery and may massively reduce its service life. Many of the 12 V consumers, such as for example radiator fan motor, EPS motor, ESP motor or actuator, etc., also have the potential to feed electrical energy into the vehicle electrical system in certain situations, which may further intensify the pulsations in the vehicle electrical system. Furthermore, the vehicle may become destabilized due to vibrations in the drive train and/or the driver may become massively confused by the behavior of the pedals or of the steering wheel.

Since such errors may occur in all consumers and in the interposed lines, a selective shut-off of elements or devices of a control system for a vehicle is provided. In the process, a cause of the malfunction is recognized or preventatively diagnosed and, as a consequence, a selective shut-off of elements or devices of the control system is carried out in such a way that a fundamental driving function of the vehicle is still provided.

This is achieved in that a piece of malfunction information diagnosed by a diagnostic module is transferred to a battery management system which, in combination with the diagnostic module, shuts off the affected electrical circuits, and switches an energy supply of the low-voltage network over to available DC/DC energy sources or other electrical energy sources. This is achieved in that the diagnostic module acts as a selective shut-off or switch-over device.

FIG. 1 shows an electrical/electronic architecture (E/E architecture) of a described control system 100 for a vehicle, which may provide a described functionality. Two independently redundant high-voltage batteries 1*a*, 1*b* (having, e.g., 400 V DC voltage) are apparent, which each feed a high-voltage network HN1, HN2 and are each connected to or disconnected from high-voltage network HN1, HN2 via an assigned battery management device 2*a*, 2*b*. Furthermore, a switch S for the defined switching (e.g., charging, equalizing charging energy, connecting in series, etc.) of high-voltage batteries 1*a*, 1*b* may be activated with the aid of battery management devices 2*a*, 2*b*. An electric motor M1, M2 of high-voltage networks HN1, HN2 is activated in each case via a respective power electronics 11*a*, 11*b*.

Furthermore, a first low-voltage network NN1 and a second low-voltage network NN2 are apparent in control system 100, which are each supplied with electrical 12 V energy (electrical control voltage) by a DC/DC converter 3*a*, 3*b*. Advantageously, a 12 V rechargeable battery 4 may be connected to one of low-voltage networks NN1 in the event of an error, which is particularly useful, for example, when, due to a failure of high-voltage batteries 1*a*, 1*b*, subsequently also DC/DC converters 3*a*, 3*b* no longer provide any 12 V supply voltage for low-voltage networks NN1, NN2. Furthermore, instead of DC/DC converter 3*b*, a charger 12 may also be connected to low-voltage network NN2. 12 V rechargeable battery 4 may be charged with the aid of charger 12.

Furthermore, a first communication network KN1 and a second communication network KN2 are provided in control system 100, which may be designed, for example, as a CAN bus, Ethernet, etc. Central communication interfaces 9*a*, 9*b* (gateways) and a braking control device 8 (e.g., integrated power brake (IPB)) for locally controlling a braking by wire or deceleration of the vehicle are connected to communication networks KN1, KN2. Messages for activating electronic control units of control system 100 are transferred via the described communication networks KN1, KN2. In the process, a steering control device 5, a control unit for recording a driver request 6, a control unit for automated driving 7, and a braking control device 8 may be provided as electronic control units. In addition, further electronic control units not illustrated in FIG. 1 are also possible. A so-called "degradability" of networks and consumers of control system 100 is, in particular, controlled by a diagnostic module 10 which, in cooperation with battery management systems 2*a*, 2*b*, carries out a preventive diagnosis (e.g., ascertainment of changes in resistance due to line breakage, aging effects, vibrations, temperature effects, short-term critical electrical voltage demands, etc.) of all lines of all networks, HN1, HN2, NN1, NN2, KN1, KN2, and thereby causes a selective switching of the consumers and producers or control units connected to control system 100 in such a way that fundamental driving functions (e.g., steering, braking, controlling, navigating, etc.) of the vehicle are still provided even when the defect is present.

Using the described control system 100 for a vehicle, in this way the following advantageous functions, which hereafter are only mentioned by way of example, are possible:

The electrical control voltage of 12 V low-voltage networks NN1, NN2 is assigned to the communication level including communication networks KN1, KN2 and the available redundancies. This means that, due to the existence of the two independently redundant low-voltage networks NN1, NN2 and the two independently redundant communication networks KN1, KN2, the electronic control units are in each case connected to the same strand (low-voltage and communication network) since otherwise the availability is reduced in the event of a failure of the 12 V supply and the communication. Even though an electronic control unit may fail completely, e.g., when using the described method, the remaining available control units are able to maintain the nominal function (usually at reduced performance) of the failed control unit, or provide a degraded function of the failed function. Due to the independent redundancy, it is advantageously possible in this way that an error in one of networks NN1, NN2, KN1, KN2, HN1, HN2 cannot impair a functionality of a respective other network NN1, NN2, KN1, KN2, HN1, HN2 assigned to the respective network NN1, NN2, KN1, KN2, HN1, HN2.

Essential systems of the vehicle for safeguarding the driving operation up to a safe standstill or state (fail state or fail operational state), such as brake and steering, are each connected to the two communication networks KN1, KN2 and to the two 12 V low-voltage networks NN1, NN2, which are each galvanically or "sufficiently safely" isolated from one another.

All high-voltage consumers are preferably connected to the two high-voltage networks HN1, HN2, so that high-voltage shut-offs only affect one strand (including high-voltage, low-voltage and communication networks), and a high-voltage consumer is thus even still functional in the event of a complete shut-off of a high-voltage network. The respective strand should preferably be assigned once to the first and once to the second low-voltage and communication network, so that errors in the high-voltage network as well as high-voltage operational shut-offs cannot result in errors in other networks.

Diagnostic module 10 is, in particular, provided for preventive diagnoses of the lines of all networks, including detection and/or simulation of electrical line resistances and of electrical currents, and may provide appropriate pieces of information to the consumers connected to the networks, so that defined consumers may be preventatively shut-off or evacuated from the assigned network before an error occurs.

The degradable consumers include, for example, a control unit 7 for driver assistance systems, which is preferably connected to a different low-voltage network NN1, NN2 than a control unit 6 for a motor and thermal management. Advantageously, this supports the fact that a failure or shut-off of control unit 7 for driver assistance systems may be at least partially compensated for by control unit 6 for a motor and thermal management, and vice versa.

It is thus apparent that control units, energy systems, drives and networks are situated and functionally connected to one another in the described control system 100 in such a way that, in the event of an error of the vehicle (e.g., due to an accident), never is it the case that all control units, energy systems, drives and networks are damaged or may fail simultaneously.

The line diagnosis by diagnostic module 10 should thus not only implement the diagnosis of high-voltage networks HV1, HV2, but additionally also a diagnosis of low-voltage networks NN1, NN2 and should consolidate this into a potential degradation. Using diagnostic module 10, a switching and shut-off of all devices connected to the networks may be carried out anticipatorily (predictive maintenance).

The pieces of diagnostic information regarding the low-voltage and high-voltage networks are provided to battery management devices 2a, 2b in real time, to the extent possible, so that these pieces of diagnostic information are detected together with battery states of high-voltage batteries 1a, 1b. In this way, battery management devices 2a, 2b may selectively disconnect or shut off the corresponding high-voltage networks HN1, HN2 with the aid of contactors and/or power switches 12a, 12b to avoid error propagation. Battery management devices 2a, 2b are control units which are connected to other control units via different hard-wired signals, and also via bus systems (e.g., CAN bus, etc.). Errors in the high-voltage networks, in the connections, in the communication, in the cooling water, etc., often result in requirements that battery management device 2a, 2b thereby opens contactors, and thus disconnects circuits.

In addition, a so-called "degradation manager" (not shown) may be provided for controlling the described selective degradation.

Critical consumers in low-voltage networks NN1, NN2 may be identified and selectively shut off by the described monitoring system, as long as no availability of an essential vehicle guidance function is jeopardized thereby. Since all vehicle guidance functions even today have redundant 12 V power supplies, critical circuits may be shut off with the aid of battery management devices 2a, 2b, as is required for an emergency operation of the automated vehicle.

Furthermore, battery management devices 2a, 2b may thus also switch off critical circuits, as is necessary for an emergency operation of control system 100. With the aid of the battery management devices, the 12 V supply may be maintained via DC/DC converters 3a, 3b, as long as high-voltage batteries 1a, 1b are able to maintain the electrical energy supply at a low level.

Furthermore, battery management devices 2a, 2b may also initiate the selective shut-off of high-voltage networks HN1, HN2 and of low-voltage networks NN1, NN2, depending on the cause of the errors.

Using the described control system 100, a degradation of the networks and of the devices connected to the networks may be carried out in such a way that a vehicle equipped with control system 100 is transferrable into a safe state.

For this purpose, it is provided that messages transferred to the control devices are checked for consistency and plausibility regarding the functionality of driving functions of the vehicle.

Figure 2:
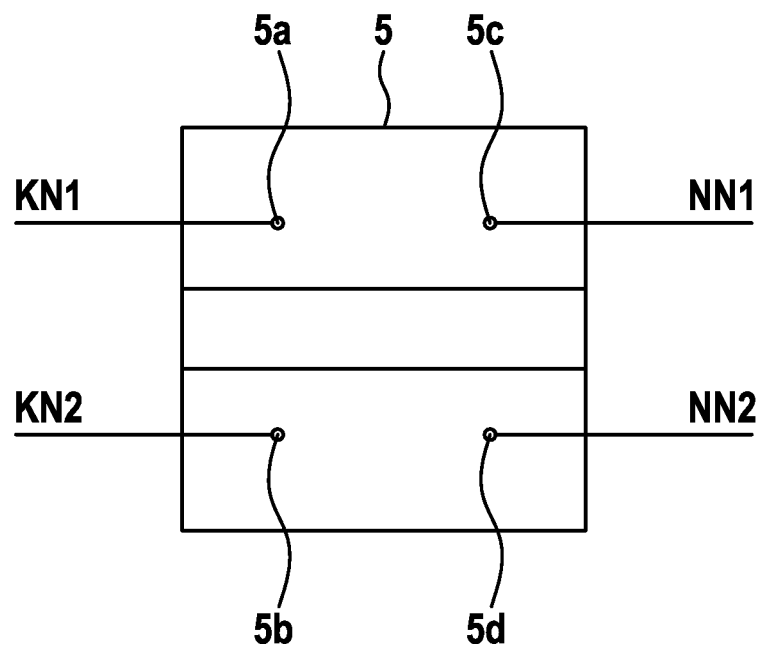
FIG. 2 shows a schematic block diagram of a control unit, in accordance with an example embodiment of the present invention.

FIG. 2 shows a schematic block diagram of a control unit or of a control device, in this case a steering control unit 5 of the vehicle. Two inputs 5a, 5b for connecting to the two communication networks KN1, KN2 and two inputs 5c, 5d for connecting to low-voltage networks NN1, NN2 for providing a 12 V power supply are apparent. Interfaces 5a, 5b and 5c, 5d are each independently redundantly configured, which means that a failure of a connected network KN1, KN2, NN1, NN2 cannot disadvantageously impair a function of the control unit. A galvanic isolation of inputs 5a, 5c from inputs 5b, 5d, which supports a functional independence of the described inputs, is graphically illustrated by separating lines in FIG. 2. In this way, it is ensured that both the transferred messages via communication networks KN1, KN2 and the electrical supply via low-voltage networks NN1, NN2 are ensured at all times, i.e., also in the event of an error of the vehicle.

Figure 3:
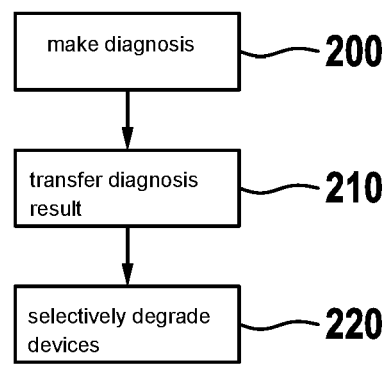
FIG. 3 shows a schematic representation of a method for operating a control system for a vehicle, in accordance with an example embodiment of the present invention.

FIG. 3 shows a schematic sequence of one specific embodiment of the described method.

In a step 200, a diagnosis is made of in each case independently redundantly configured electrical high-voltage, low-voltage and electrical communication networks HN1, HN2, NN1, NN2, KN1, KN2 of a control system 100 of the vehicle, which are functionally connected to one another.

In a step 210, a transfer is made the diagnosis result to independently redundant battery management devices 2a, 2b of control system 100, an error in a first battery management device not impairing a functionality of a second battery management device, and vice versa.

In a step 220, a selective degrading of devices of the electrical high-voltage, electrical control voltage and electrical communication networks HN1, HN2, NN1, NN2, KN1, KN2 as a function of the diagnosis result takes place in such a way that devices connected to the electrical energy supply, electrical control voltage and electrical communication networks HN1, HN2, NN1, NN2, KN1, KN2 are still sufficiently functional.

Advantageously, the described method may be implemented in the form of a software program including suitable program code, which runs on diagnostic module 10 and battery management devices 2a, 2b. This enables an easy adaptability of the method.

As a result, a system made up of mutually interconnected control units may thus be implemented, which for a defined functionality provides at least one control unit, which provides assigned pieces of information or data via a communication network, and an assigned control unit which receives the pieces of information via the communication network and converts them into actuation for the vehicle.

A typical application scenario of the present invention could be an automated vehicle including functions higher than SAE Level 2, in which, during the driving operation, the driver is replaced by a machine system for a defined period of time.

Those skilled in the art will suitably modify the features of the present invention and/or combine them with one another, without departing from the core of the present invention, in view of the disclosure herein.

What is claimed is:

1. A control unit for a vehicle, comprising:
   interfaces for connection to two independently redundant communication networks, messages to and from the control unit being transferrable via a second communication network of the redundant communication networks, and vice versa, following a failure of a first communication network of the redundant communication networks;
   interfaces for electrical supply of the control unit via two independently redundant low-voltage networks, it being possible to electrically supply the control unit via a second low-voltage network of the redundant low-voltage networks, and vice versa, in the event of an error in a first low-voltage network redundant low-voltage networks,
   wherein the error in the first low-voltage network does not impair a functionality of a second low-voltage network, and vice versa; and
   a degradation device configured to diagnose errors in the low-voltage and communication networks and to selectively degrade the control unit connected to the low-voltage and communication networks.

2. A control system for a vehicle, comprising:
   two independently redundant high-voltage networks configured to provide electrical energy;
   two independently redundant low-voltage networks configured to provide electrical control voltage;
   two independently redundant communication networks configured to transfer messages between control units connected to the communication networks; and
   a degradation device configured to diagnose errors in the high-voltage, low-voltage, and communication networks and to selectively degrade the control units connected to the high-voltage, low-voltage, and communication networks, the control system offering a sufficient functionality for a driving operation of the vehicle,
   wherein, in the event of an error of a high-voltage network of the high-voltage networks, a DC/DC converter is shut off, and a rechargeable battery for an electrical supply of one of the low-voltage networks is connected.

3. The control system as recited in claim 2, wherein the degradation device includes a diagnostic module configured to carry out the diagnosis, and a battery management device configured to selectively degrade the control units.

4. The control system as recited in claim 3, wherein the diagnostic module and the battery management devices are configured to be mutually monitorable.

5. The control system as recited in claim 3, wherein a state of the high-voltage, low-voltage, and communication networks is ascertainable using the battery management devices, corresponding data being transferrable via communication interfaces.

6. A control system for a vehicle, comprising:
   two independently redundant high-voltage networks configured to provide electrical energy;
   two independently redundant low-voltage networks configured to provide electrical control voltage;
   two independently redundant communication networks configured to transfer messages between control units connected to the communication networks; and
   a degradation device configured to diagnose errors in the high-voltage, low-voltage, and communication networks and to selectively degrade the control units connected to the high-voltage, low-voltage, and communication networks, the control system offering a sufficient functionality for a driving operation of the vehicle,
   wherein the degradation device includes a diagnostic module configured to carry out the diagnosis, and a battery management device configured to selectively degrade the control units,
   wherein a preventive and/or actual diagnosis of lines connected to the high-voltage, low-voltage, and communication networks and a selective shut-off of control units connected to the high-voltage, low-voltage, and communication networks may be initiated and carried out using the diagnostic module.

7. A method for operating a vehicle, comprising the following steps:
   diagnosing, in each case, independently redundantly configured electrical high-voltage, electrical low-voltage, and electrical communication networks of a control system of the vehicle, which are functionally connected to one another;
   transferring the diagnosis result to independently redundant battery management devices of the control system, an error in a first battery management device not impairing a functionality of a second battery management device, and vice versa; and
   selectively degrading control devices connected to the electrical high-voltage, electrical low voltage, and electrical communication networks as a function of the diagnosis result in such a way that control units connected to the electrical energy supply, electrical low voltage, and electrical communication networks are still sufficiently functional for a safe driving operation of the vehicle.

8. The method as recited in claim 7, wherein a selective shut-off of electrical consumers is delayed or carried out using predefined degradation control signals.

9. The method as recited in claim 7, wherein one of the high-voltage networks is connectable to the other high-voltage network via a coupling switch.

10. A method for operating a vehicle, comprising the following steps:
    diagnosing, in each case, independently redundantly configured electrical high-voltage, electrical low-voltage, and electrical communication networks of a control system of the vehicle, which are functionally connected to one another;
    transferring the diagnosis result to independently redundant battery management devices of the control system, an error in a first battery management device not impairing a functionality of a second battery management device, and vice versa; and
    selectively degrading control devices connected to the electrical high-voltage, electrical low voltage, and electrical communication networks as a function of the diagnosis result in such a way that control units connected to the electrical energy supply, electrical low voltage, and electrical communication networks are still sufficiently functional for a safe driving operation of the vehicle, wherein a selective shut-off of electrical devices which are not necessary for fulfilling necessary driving functions of the vehicle is carried out.

11. The method as recited in claim 10, wherein the control units includes a braking control unit, a steering control unit, a control unit for driver assistance systems, and a control unit for engine management, and wherein at least one of the control units is kept operational for a driving operation of the vehicle.

12. A method for operating a vehicle, comprising the following steps:

diagnosing, in each case, independently redundantly configured electrical high-voltage, electrical low-voltage, and electrical communication networks of a control system of the vehicle, which are functionally connected to one another;

transferring the diagnosis result to independently redundant battery management devices of the control system, an error in a first battery management device not impairing a functionality of a second battery management device, and vice versa; and selectively degrading control devices connected to the electrical high-voltage, electrical low voltage, and electrical communication networks as a function of the diagnosis result in such a way that control units connected to the electrical energy supply, electrical low voltage, and electrical communication networks are still sufficiently functional for a safe driving operation of the vehicle, wherein a selective shut-off of electrical consumers connected to the networks, which is carried out based on a diagnosis, results in soft switchovers, during which the vehicle does not carry out any abrupt movements.

13. A non-transitory computer-readable data medium on which is stored a computer program including program code for operating a vehicle, the program code, when executed by a computer, causing the computer to perform the following steps:

diagnosing, in each case, independently redundantly configured electrical high-voltage, electrical low-voltage, and electrical communication networks of a control system of the vehicle, which are functionally connected to one another;

transferring the diagnosis result to independently redundant battery management devices of the control system, an error in a first battery management device not impairing a functionality of a second battery management device, and vice versa; and selectively degrading control devices connected to the electrical high-voltage, electrical low voltage, and electrical communication networks as a function of the diagnosis result in such a way that control units connected to the electrical energy supply, electrical low voltage, and electrical communication networks are still sufficiently functional for a safe driving operation of the vehicle.

\* \* \* \* \*